United States Patent
McColloch

(10) Patent No.: US 9,733,441 B2
(45) Date of Patent: Aug. 15, 2017

(54) HEAT DISSIPATION CLAMP AND METHODS, DEVICES AND SYSTEMS FOR FACILITATING HEAT DISSIPATION IN OPTICAL COMMUNICATIONS MODULES

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/926,306

(22) Filed: Oct. 29, 2015

(65) Prior Publication Data

US 2017/0123174 A1    May 4, 2017

(51) Int. Cl.
 *G02B 6/42* (2006.01)
 *G02B 6/43* (2006.01)

(52) U.S. Cl.
 CPC .......... *G02B 6/4269* (2013.01); *G02B 6/426* (2013.01); *G02B 6/428* (2013.01); *G02B 6/4292* (2013.01); *G02B 6/43* (2013.01)

(58) Field of Classification Search
 None
 See application file for complete search history.

(56) References Cited

U.S. PATENT DOCUMENTS

| | | |
|---|---|---|
| 6,137,298 A | 10/2000 | Binns |
| 6,430,050 B1 | 8/2002 | Hensley et al. |
| 6,449,157 B1 | 9/2002 | Chu |
| 6,545,879 B1 | 4/2003 | Goodwin |
| 7,428,154 B2 * | 9/2008 | Ishimine ............. H01L 23/4006 165/185 |
| 9,063,306 B2 * | 6/2015 | Little ................... G02B 6/4269 |
| 2011/0268397 A1 | 11/2011 | Meadowcroft et al. |
| 2015/0296638 A1 * | 10/2015 | Wu ..................... H05K 7/20409 174/548 |

\* cited by examiner

*Primary Examiner* — Jerry M Blevins
*Assistant Examiner* — Erin Chiem

(57) ABSTRACT

A heat dissipation system for an optical communications module is provided that includes a heat dissipation clamp having a plurality of force-application devices for applying respective, precisely-controlled forces to respective optical communications modules of an array to maintain electrical interconnectivity between the modules of the array and respective electrical sockets. The force-application devices are independent of one another such that the respective electrical interconnectivity forces applied to the respective modules are independent of one another. This independence ensures that the proper amount of electrical interconnectivity force is applied to each module of the array, which ensures that the planarity of the system PCB is maintained without the need for a backing, or bolstering, plate. Inner walls of the heat dissipation clamp are in contact with the modules so that heat generated by the modules is transferred into the heat dissipation clamp where some or all of the heat is dissipated.

14 Claims, 10 Drawing Sheets

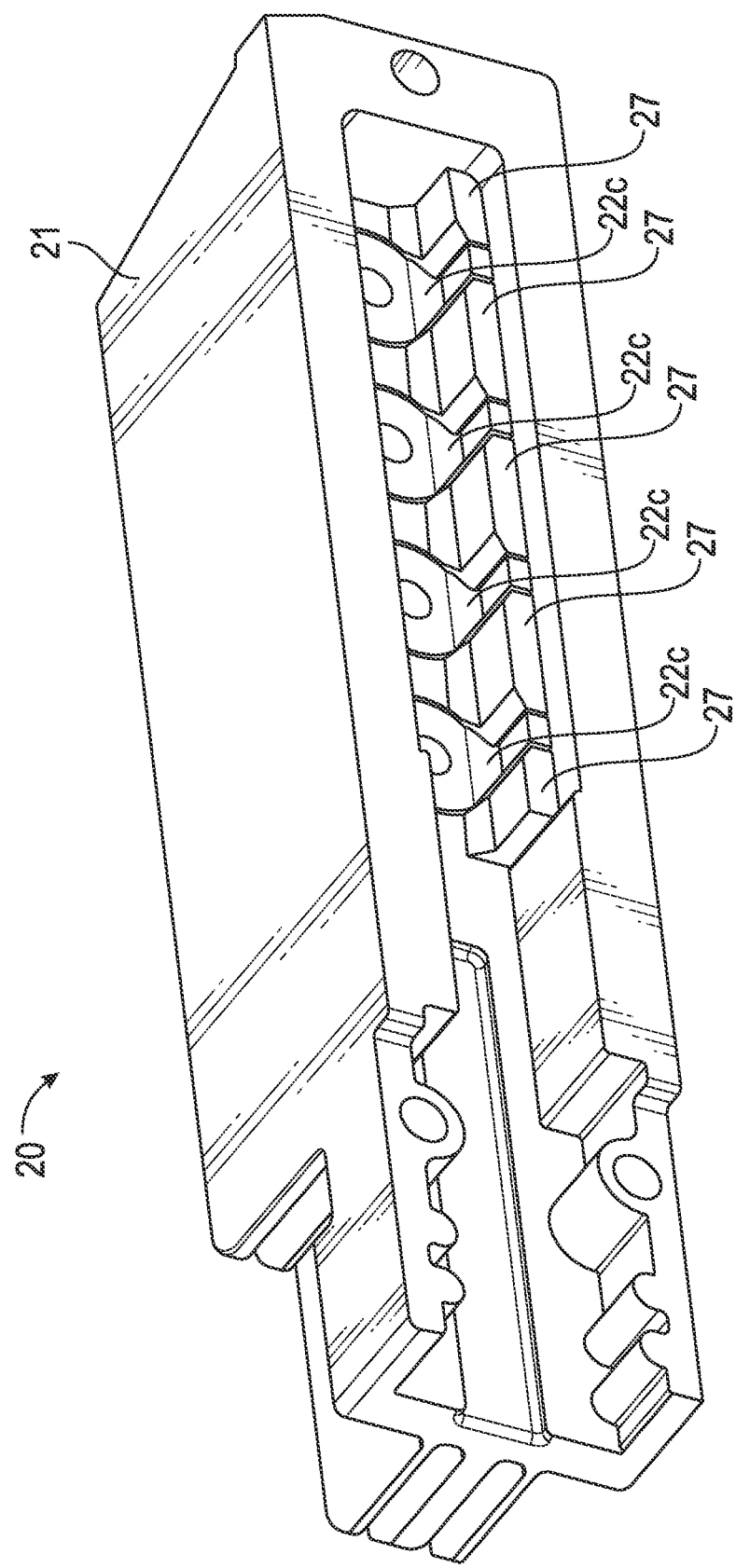

HEAT DISSIPATION CLAMP AND METHODS, DEVICES AND SYSTEMS FOR FACILITATING HEAT DISSIPATION IN OPTICAL COMMUNICATIONS MODULES

TECHNICAL FIELD OF THE INVENTION

The invention relates to optical communications modules. More particularly, the invention relates to heat dissipation systems, devices and methods for use in optical communications modules.

BACKGROUND OF THE INVENTION

A variety of parallel optical communications modules exist for simultaneously transmitting and/or receiving multiple optical data signals over multiple respective optical data channels. Parallel optical transmitter modules have multiple optical transmit channels for simultaneously transmitting multiple optical data signals over multiple respective optical waveguides (e.g., optical fibers). Parallel optical receiver modules have multiple optical receive channels for simultaneously receiving multiple respective optical data signals over multiple respective optical waveguides. Parallel optical transceiver modules have multiple optical transmit channels and multiple optical receive channels for simultaneously transmitting and receiving multiple optical data signals over multiple respective transmit and receive optical waveguides. Bidirectional (BiDi) parallel optical transceiver modules have multiple BiDi channels for simultaneously transmitting and receiving optical data signals over each channel.

A typical layout for a parallel optical communications module includes a module housing, a module circuit board, such as a printed circuit board (PCB), disposed inside of the housing, and various electrical and optoelectronic components (i.e., laser diodes and/or photodiodes) mounted on the module circuit board. Such mounting arrangements are often referred to as mid-plane or chip-on-board (COB) mounting arrangements. In a typical COB mounting arrangement, a plurality of laser diodes, a plurality of photodiodes, a laser diode driver integrated circuit (IC), a receiver IC, and various other electrical components are mounted on and electrically interconnected with the module circuit board.

Parallel optical communications modules that use COB mounting arrangements are often configured to plug into and electrically interconnect with sockets mounted on a system PCB, such as a land grid array (LGA) socket, for example. An LGA socket has arrays of electrical contacts commonly disposed on its upper and lower surfaces. For example, the array of electrical contacts disposed on the lower surface may be a ball grid array (BGA) and the array of electrical contacts disposed on the upper surface may be an LGA. The electrical contacts disposed on the upper surface of the LGA socket are typically soldered to respective electrical contacts of an array of electrical contacts disposed on a lower surface of the module PCB to electrically interconnect the module PCB and the LGA socket. The electrical contacts disposed on the lower surface of the LGA socket are electrically interconnected with respective electrical contacts of an array of electrical contacts disposed on the upper surface of the system PCB. In order to maintain a good electrical connection between the electrical contacts disposed on the upper surface of the LGA socket and the electrical contacts disposed on the lower surface of the module, a proper force needs to be maintained on the module to press it against the LGA socket.

Laser diodes are very sensitive to temperature. Generally, in order to increase the speed of laser diodes without sacrificing reliability, the operating temperatures of the laser diodes need to be maintained at or below some maximum allowable temperature. Heat dissipation solutions for optical communications modules are designed to prevent the temperatures of the laser diodes from rising above impermissible levels. The laser diodes and photodiodes are often arranged in respective arrays formed in respective semiconductor chips. These chips and the laser diode driver and receiver IC chips are often mounted on one or more metal heat sinks of the module circuit board. Heat generated by the chips is dissipated into the heat sink. Air flow through the housing is often used to provide convective cooling to assist in heat dissipation.

Some parallel optical communications modules have one or more heat sink blocks that are used in combination with an external heat dissipation device to perform heat dissipation. Lower surfaces of the heat sink blocks are mechanically and thermally coupled with the module circuit board. Upper surfaces of the heat sink blocks are exposed for mechanically and thermally coupling the blocks with the external heat dissipation device. Heat generated by the electrical and optoelectronic components of the module passes through the heat sink blocks and into the external heat dissipation device.

The upper surfaces of the heat sink blocks are generally planar surfaces that have small surface variations in them due to imperfections in the material (often copper) and/or manufacturing process used to make them. Compliant thermal pads are typically placed on the upper surfaces of the blocks and sandwiched in between the upper surfaces of the blocks and the lower surface of the external heat dissipation device. Because the thermal pads are compliant, or deformable, they conform to these surfaces. The compliant thermal pads fill in any surface variations to ensure that the thermal pathways between the heat sink blocks and the external heat dissipation device are uninterrupted.

The force that is needed for good electrical connectivity between the electrical contacts disposed on the lower surface of the module PCB and the electrical contacts disposed on the upper surface of the LGA socket may be, for example, 50 pounds (lbs). This force, referred to hereinafter as the electrical interconnectivity force, can cause the system PCB to deflect out of range of the LGA socket. A backing plate, sometimes referred to as a bolster plate, is sometimes used to prevent the system PCB from deflecting out of range of the LGA socket. The thermal pads are either designed to have inherent spring forces or are seated on springs to partially counter the electrical interconnectivity force to provide a proper thermal coupling force.

In order to create higher bandwidth optical communications systems, arrays of parallel optical communications modules are sometimes used with arrays of LGA sockets mounted on a system PCB. In such systems, it is more difficult to maintain the planarity of the system PCB, which makes it difficult to maintain the electrical interconnections between the modules and the respective LGA sockets. In such systems, it is even more difficult to prevent the electrical interconnectivity forces from causing the system PCB to be deflected out of range of the LGA sockets. It is also difficult in such systems to provide strain relief for the optical fiber cables associated with each of the modules and to prevent forces on the cables from being transferred to the modules, thereby adversely affecting the electrical interconnectivity between the modules and the respective LGA sockets.

A need exists for a heat dissipation system for use in an optical communications module that provides precisely-controlled electrical interconnectivity forces while also providing an effective heat dissipation solution. A need also exists for a way to provide strain relief for the optical fiber cables so that the interconnectivity between the modules and the sockets is not adversely affected by forces exerted on the cables.

BRIEF DESCRIPTION OF THE DRAWINGS

FIGS. 6a and 6B illustrate top and bottom perspective views, respectively, of one of the heat dissipation clamps shown in FIG. 1.

WRITTEN DESCRIPTION

Figure 1:
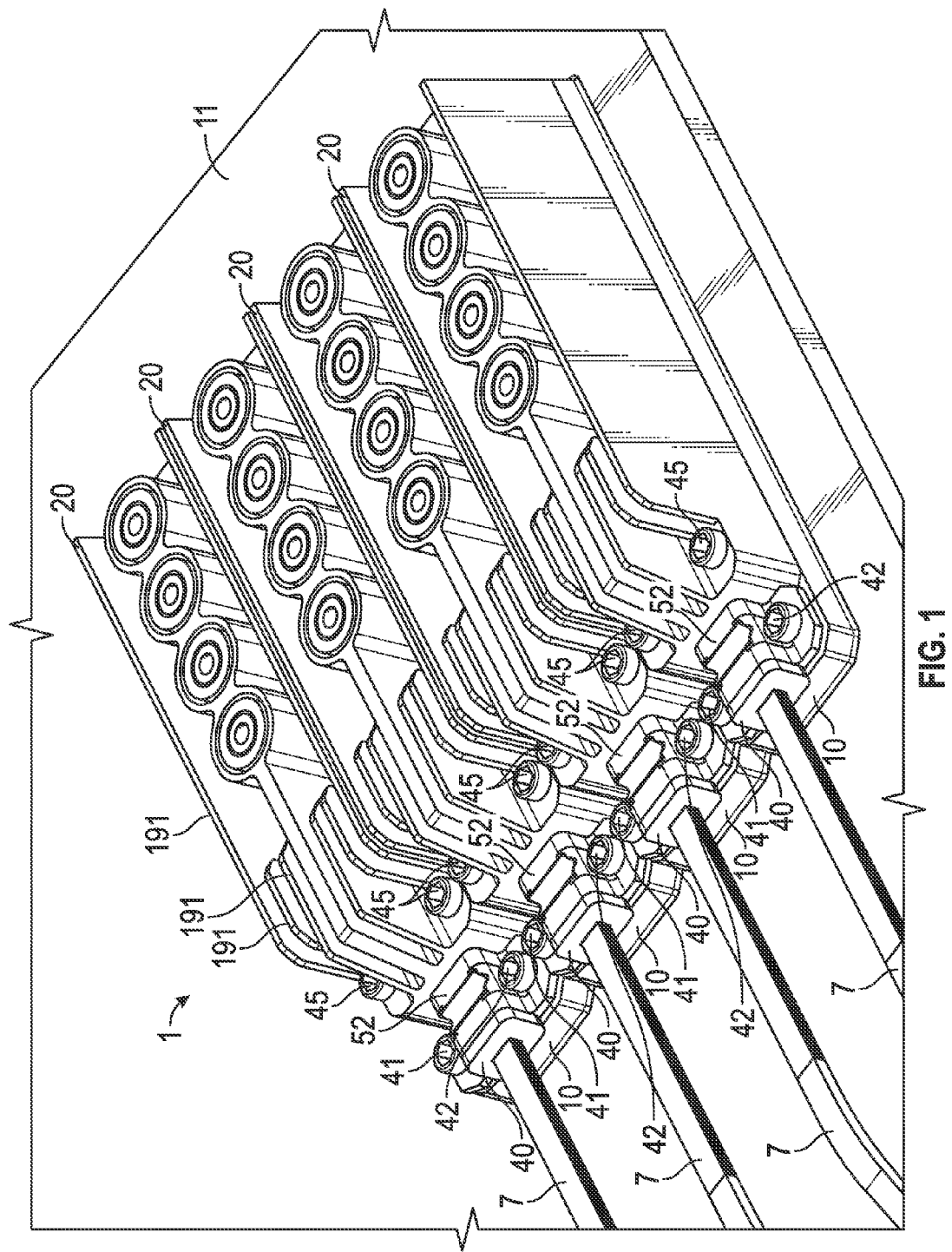
FIG. 1 illustrates a top perspective view of an illustrative embodiment of a 4×4 array of parallel optical communications modules mounted on four frames that are secured to an upper surface of a system PCB and that have four heat dissipation clamps secured thereto.

In accordance with illustrative embodiments described herein, a heat dissipation system for an optical communications module is provided that includes one or more heat dissipation clamps having a plurality of force-application devices for applying respective, precisely-controlled forces to respective optical communications modules of an array in order to establish and maintain electrical interconnectivity between the array of modules and the respective electrical sockets. The force-application devices are independent of one another such that the respective electrical interconnectivity forces applied to the respective modules by the respective force-application devices are independent of one another. This independence ensures that the proper amount of electrical interconnectivity force is applied to each module of the array, which the clamps accomplish without the need to use a backing, or bolstering, plate with the system PCB, and even in cases where the system PCB has some non-planarities. Inner walls of the heat dissipation clamp are in contact with the modules and the body of the heat dissipation clamp is made of a material having high thermal conductivity so that heat is transferred from the modules into the heat dissipation clamp where some or all of the heat is dissipated. Illustrative embodiments will now be described with reference to the figures, in which like reference numerals are used to identify like features, components or elements.

The term "electrical interconnectivity force," as that term is used herein, denotes a force that is applied to an optical communications module in a direction toward a respective socket on which the module is mounted, such as an LGA socket, for example, to maintain electrical connections between electrical contacts disposed on the lower surface of the module PCB and respective electrical contacts disposed on the upper surface of the socket.

Figure 2:
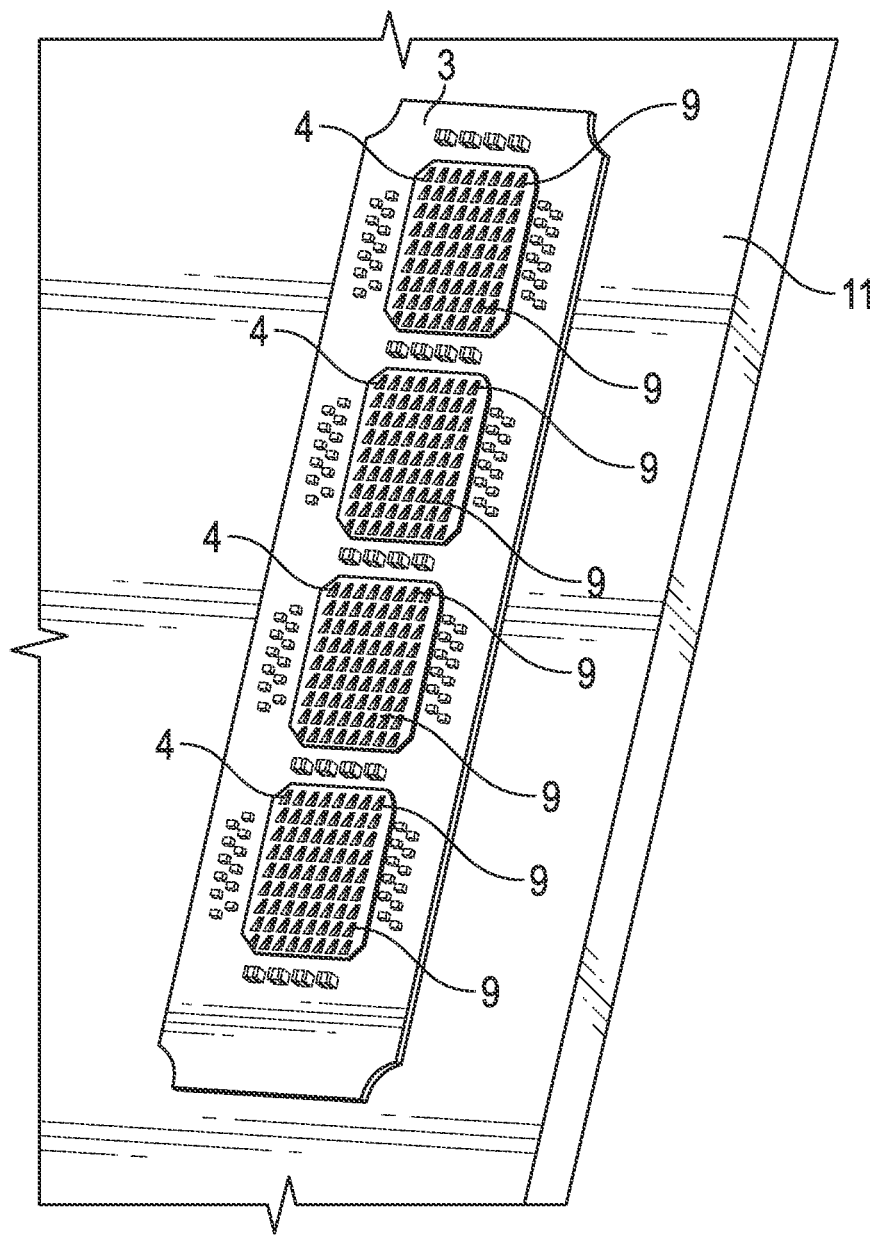
FIG. 2 illustrates a top perspective view of a four-LGA socket/PCB secured to the upper surface of the system PCB shown in FIG. 1.
Figure 3:
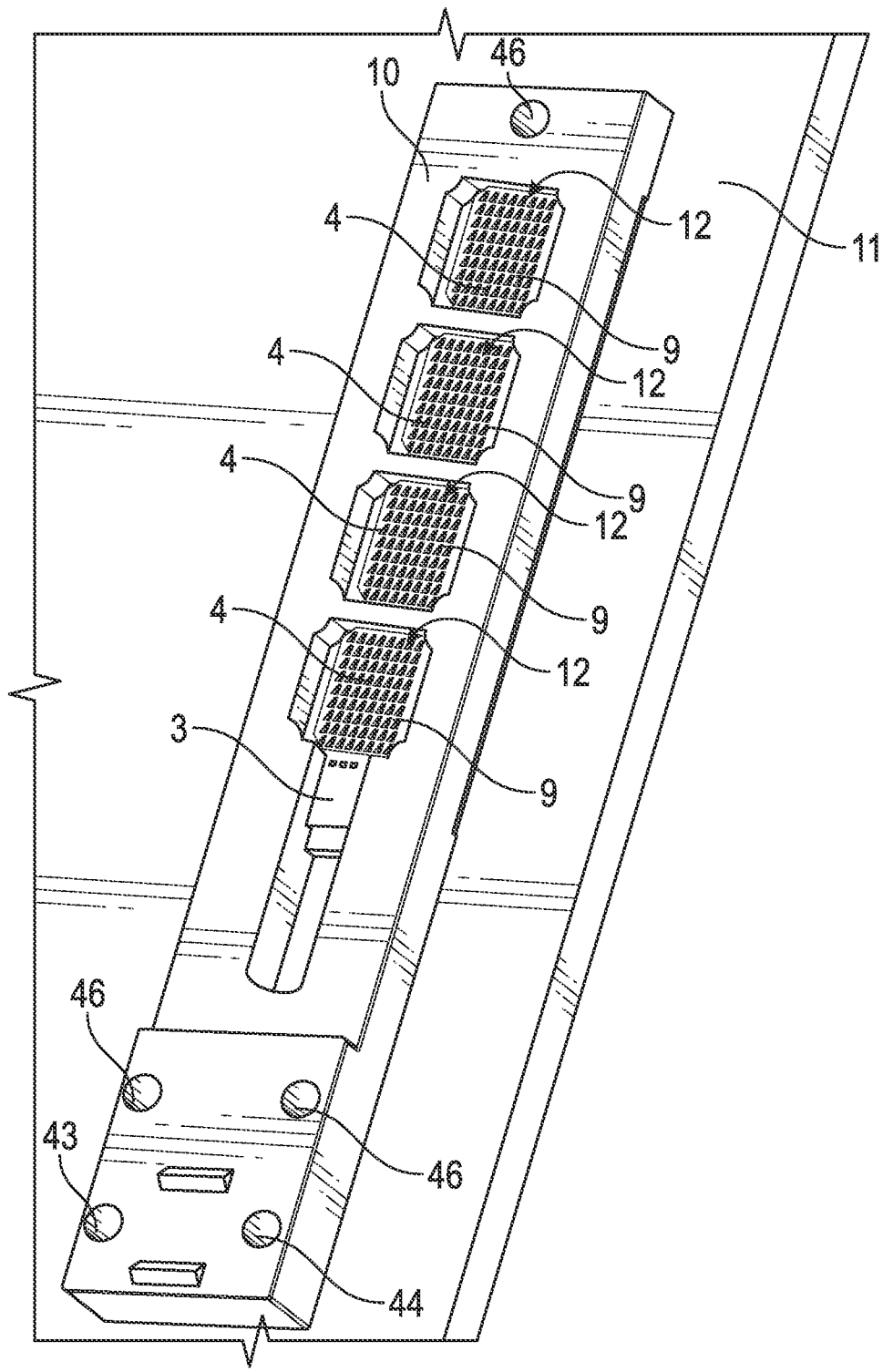
FIG. 3 illustrates a top perspective view of one of the frames secured to the upper surface of the system PCB and having four openings 12 formed therein for receiving four respective parallel optical communications modules that electrically interface with the four LGA sockets.
Figure 4:
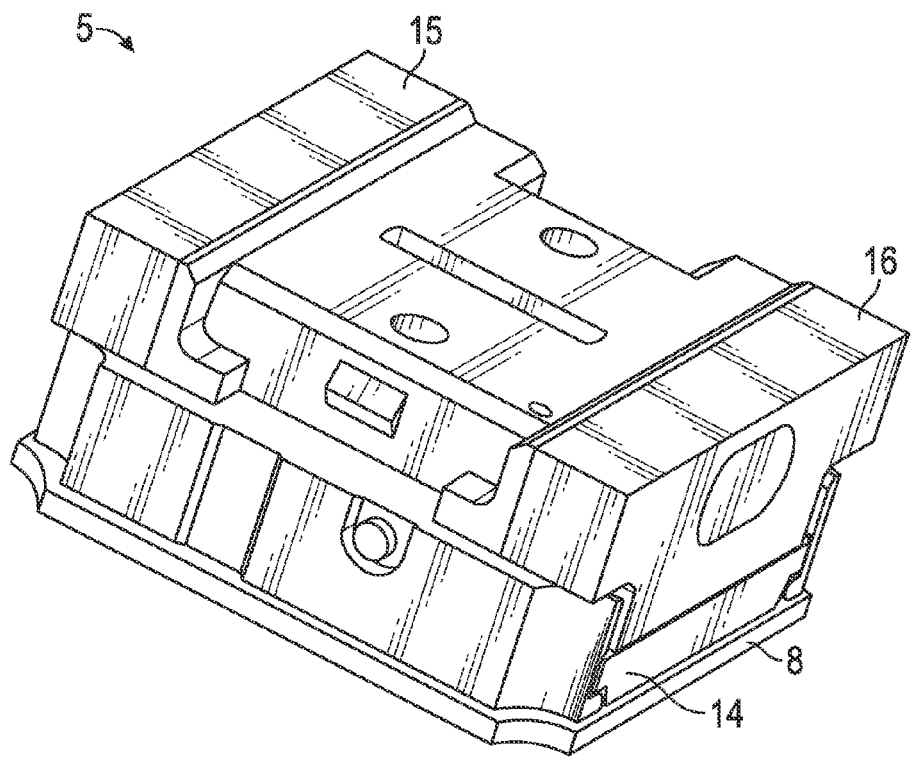
FIG. 4 illustrates a top perspective view of a parallel optical communications module that is suitable for use in the 4×4 array shown in FIG. 1.
Figure 5:
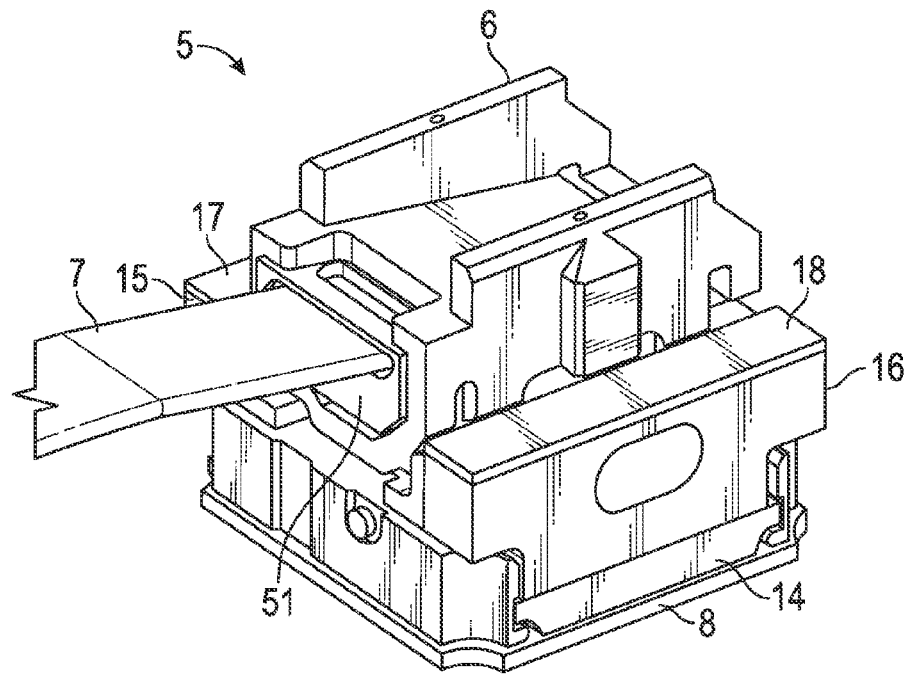
FIG. 5 illustrates a top perspective view of the parallel optical communications module shown in FIG. 4 with an optical connector secured thereto that holds an end of an optical fiber ribbon cable.

FIG. 1 illustrates a top perspective view of an illustrative embodiment of a 4×4 array 1 of parallel optical communications modules mounted on four frames 10 that are secured to an upper surface of a system PCB 11 and that have four heat dissipation clamps 20 secured thereto. FIG. 2 illustrates a top perspective view of a single four-LGA socket/PCB 3 secured to the upper surface of the system PCB 11 shown in FIG. 1. Each socket includes an LGA connector 4. FIG. 3 illustrates a top perspective view of one of the frames 10 secured to the upper surface of the system PCB 11 and having four openings 12 formed therein for receiving four respective parallel optical communications modules (not shown) that electrically interface with the four LGA connectors 4, respectively, of the LGA socket/PCB 3. FIG. 4 illustrates a top perspective view of a parallel optical communications module 5 that is suitable for use in the 4×4 array 1 shown in FIG. 1. FIG. 5 illustrates a top perspective view of the parallel optical communications module 5 shown in FIG. 4 with an optical connector 6 secured thereto that holds an end of an optical fiber ribbon cable 7.

With reference to FIGS. 1-5, four of the parallel optical communications modules 5 having the optical connectors 6 secured thereto, respectively, are received in the openings 12, respectively, formed in each frame 10. Each parallel optical communications module 5 has a module PCB 8 (FIGS. 4 and 5) that has an array of electrical contacts (not shown) disposed on its lower surface. When the modules 5 are received in the respective openings 12, the electrical contacts disposed on the lower surfaces of the module PCBs 8 interconnect with respective electrical contacts of arrays of electrical contacts 9 (FIGS. 2 and 3) of the LGA connectors 4. Lower surfaces of the LGA connectors 4 have arrays of electrical contacts (not shown) thereon that are interconnected with respective electrical contacts of arrays of electrical contacts (not shown) disposed on the upper surface of the system PCB 11.

Each of the four heat dissipation clamps 20 (FIG. 1) is secured by fastening devices 45 to one of the frames 10 shown in FIG. 3. Once each of the four heat dissipation clamps 20 has been secured to one of the frames 10, precisely-controlled electrical interconnectivity forces exerted by the heat dissipation clamps 20 on the modules 5 press the modules 5 against the respective LGA connectors 4 with a preselected amount of force to ensure that electrical interconnectivity between the modules 5 and the LGA connectors 4 is achieved and maintained. As will be described below in detail, in accordance with an illustrative embodiment, each heat dissipation clamp 20 has four force-application devices that are independent of one another for independently maintaining respective electrical interconnectivity forces on the respective modules 5. This independence ensures that the proper amount of electrical interconnectivity force is applied to each module 5 of the array 1, which allows all of the modules 5 to mate to their respective LGA connectors 4, regardless of the planarity or non-planarity of the system PCB 11, without the need for a backing, or bolstering, plate.

As indicated above, failure to maintain the planarity of the system PCB can make it difficult to maintain the electrical interconnections between the modules and the respective LGA sockets due to the system PCB being deflected out of range of the LGA sockets. The independent force-application devices of the heat dissipation clamps 20 eliminate this problem by ensuring that a precise electrical interconnectivity force is applied to each module 5. In addition, as will be described below in detail, once each of the four heat dissipation clamps 20 has been secured to one of the frames 10, inner walls of the bodies of the heat dissipation clamps 20 are in contact with heat sink blocks of each of the modules 5 such that heat generated by the modules 5 that passes into the heat sink blocks of the modules 5 then passes into the heat dissipation clamps 20. Bodies of the heat dissipation clamps 20 comprise a material having high thermal conductivity so that heat passes from the heat sink blocks of the modules 5 into the bodies of the heat dissipation clamps 20 where some or all of the heat is dissipated.

The parallel optical communications module 5 shown in FIGS. 4 and 5 has a metallic mounting core 14 mounted on the upper surface of the module PCB 8. The electrical and optoelectronic components (not shown) of the module 5 are mounted on the upper surface of the mounting core 14. First and second heat sink blocks 15 and 16 are mounted on opposite ends of the mounting core 14 such that lower surfaces of the heat sink blocks 15 and 16 are in contact with the upper surface of the mounting core 14. Upper surfaces of the heat sink blocks 15 and 16 have thermal pads 17 and 18 (FIG. 5) secured thereto, respectively. As will be described below in more detail, the thermal pads 17 and 18 come into contact with inner surfaces of the respective heat dissipation clamp 20 to allow heat to be transferred from the heat sink blocks 15 and 16 into the body of the heat dissipation clamp 20 via the he thermal pads 17 and 18. In addition, as will be described below, inner surfaces of the body of the heat dissipation clamp 20 are also in contact with the outer sides of the heat sink blocks 15 and 16 to facilitate heat transfer from the blocks 15 and 16 into the heat dissipation clamp 20.

It should be noted that while the heat dissipation clamps 20, in accordance with this illustrative embodiment, are configured for use with the parallel optical communications module 5 shown in FIGS. 4 and 5, the heat dissipation clamps 20 may be configured for use with any optical communications module. Therefore, the invention is not limited with respect to the type of optical communications module with which the heat dissipation clamps 20 are used.

Figure 6A:
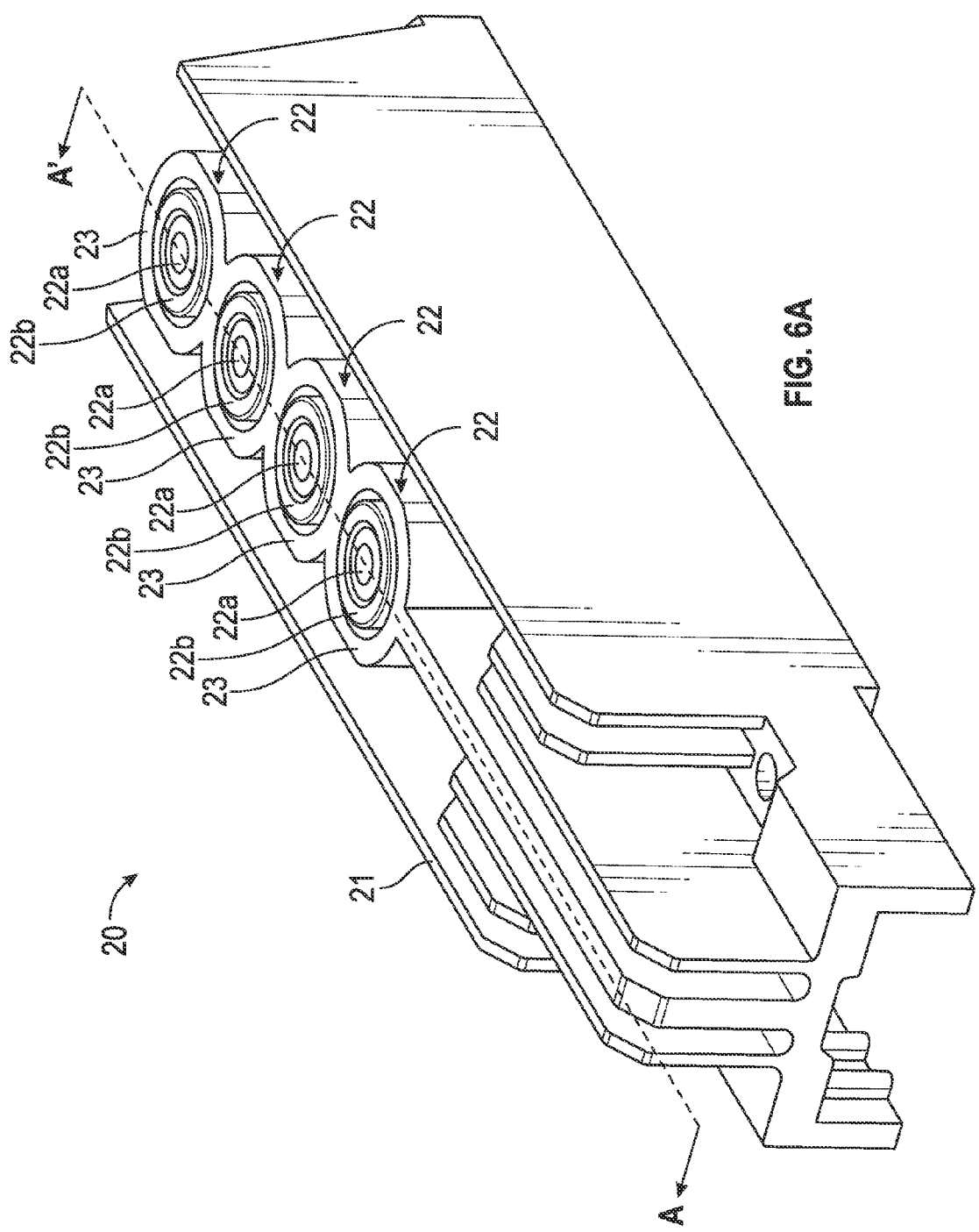
Figure 6C:
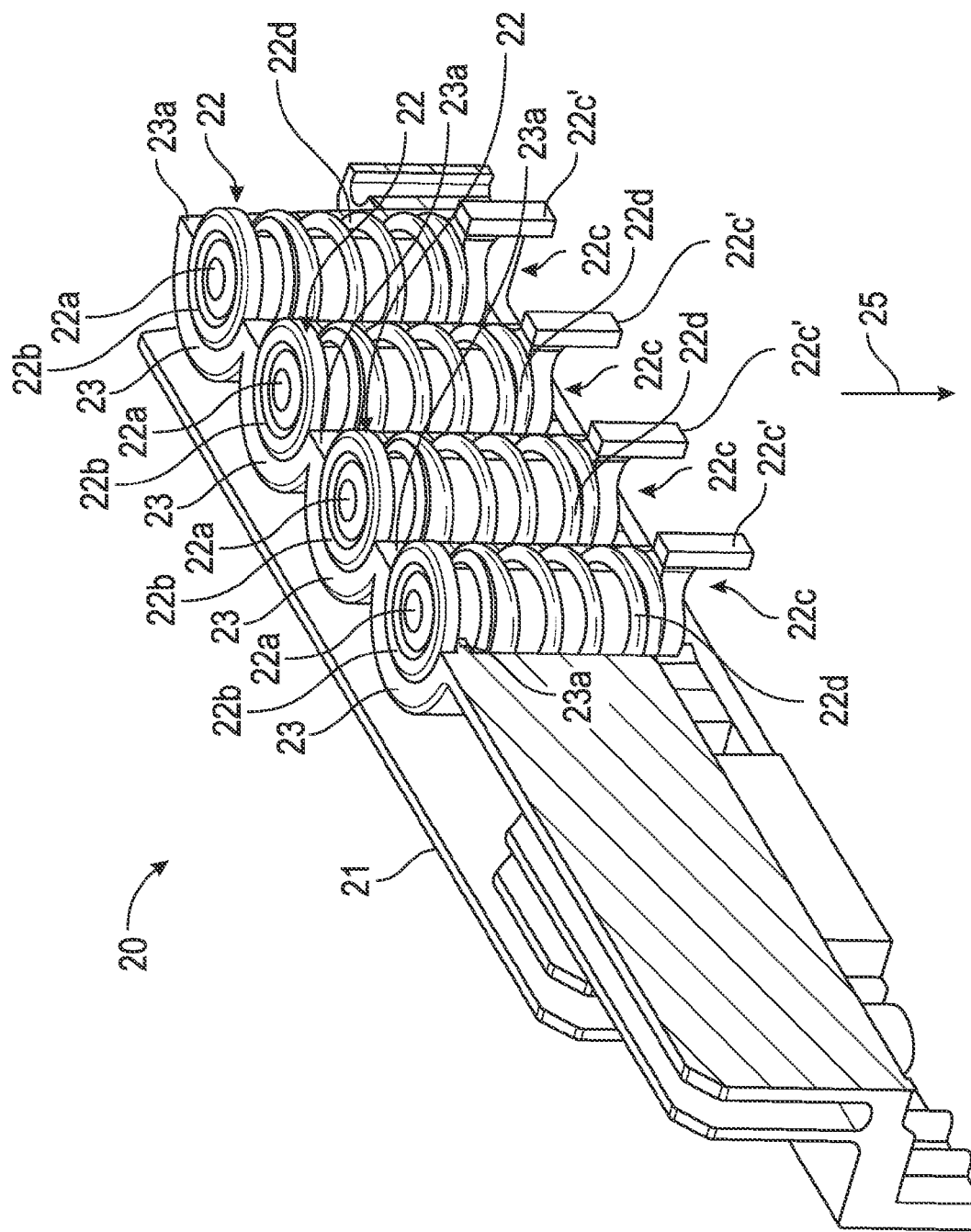
FIG. 6C illustrates a cross-sectional side perspective view of the heat dissipation clamp shown in FIG. 6A and taken along line A-A' of FIG. 6A.

FIGS. 6a and 6B illustrate top and bottom perspective views, respectively, of one of the heat dissipation clamps 20 shown in FIG. 1. FIG. 6C illustrates a cross-sectional side perspective view of the heat dissipation clamp 20 taken along line A-A' of FIG. 6A. The heat dissipation clamp 20 has a body 21 that is made of a material having high thermal conductivity, such as zinc or aluminum, for example. As indicated above, in accordance with an illustrative embodiment, the heat dissipation clamp 20 has four force-application devices 22 that are independent of one another for independently maintaining respective electrical interconnectivity forces on the respective modules 5 (FIG. 5). The components of the force-application devices 22 are best shown in FIG. 6C. Each force-application device 22 includes a hollow cylindrical shaft 22a, a cylindrical head 22b fixedly secured to a proximal end of the hollow cylindrical shaft 22a, a plunger 22c having a rod (not shown) that is inside of and coaxial with the hollow cylindrical shaft 22a and having a U-shaped collar 22c' disposed on a distal end of the plunger rod, and a compression spring 22d disposed about the shaft 22a in between the cylindrical head 22b and the U-shaped collar 22c'.

The body 21 of the heat dissipation clamp 20 has four bores 23 formed therein in which the force-application devices 22 are disposed, respectively. The springs 22d are allowed to compress and decompress to limited extents within the bores 23. Upper ends of the springs 22d are in abutment with stops 23a of the respective bores 23 and lower ends of the springs 22d are in abutment with the U-shaped collars 22c' of the plungers 22c. The cylindrical heads 22b are fixedly secured to upper surfaces of the respective stops 23a and/or to the inner walls of the respective bores 23. The forces of the springs 22d against the respective U-shaped collars 22c' urge the respective U-shaped collars 22c' in the downward direction indicated by arrow 25.

As will be described below in more detail, once the 4×4 array 1 shown in FIG. 1 has been fully assembled, the forces exerted in the direction of arrow 25 against the modules 5 by the respective U-shaped collars 22c' provide the precise amount of pressure needed to maintain electrical interconnectivity between the modules 5 and the respective LGA connectors 4. In the fully assembled configuration shown in FIG. 1, the inner walls, or heat sink surfaces 27 (FIG. 6B) of the body 21 of the heat dissipation clamp 20 are in contact with the thermal pads 17 and 18, respectively, mounted on the upper surfaces of the heat sink blocks 15 and 16, respectively (FIG. 5). Thermal pads 17 and 18 are in thermal contact with body 21 by contact between the thermal pads 17 and 18 and the heat sink surfaces 27.

Figure 7:
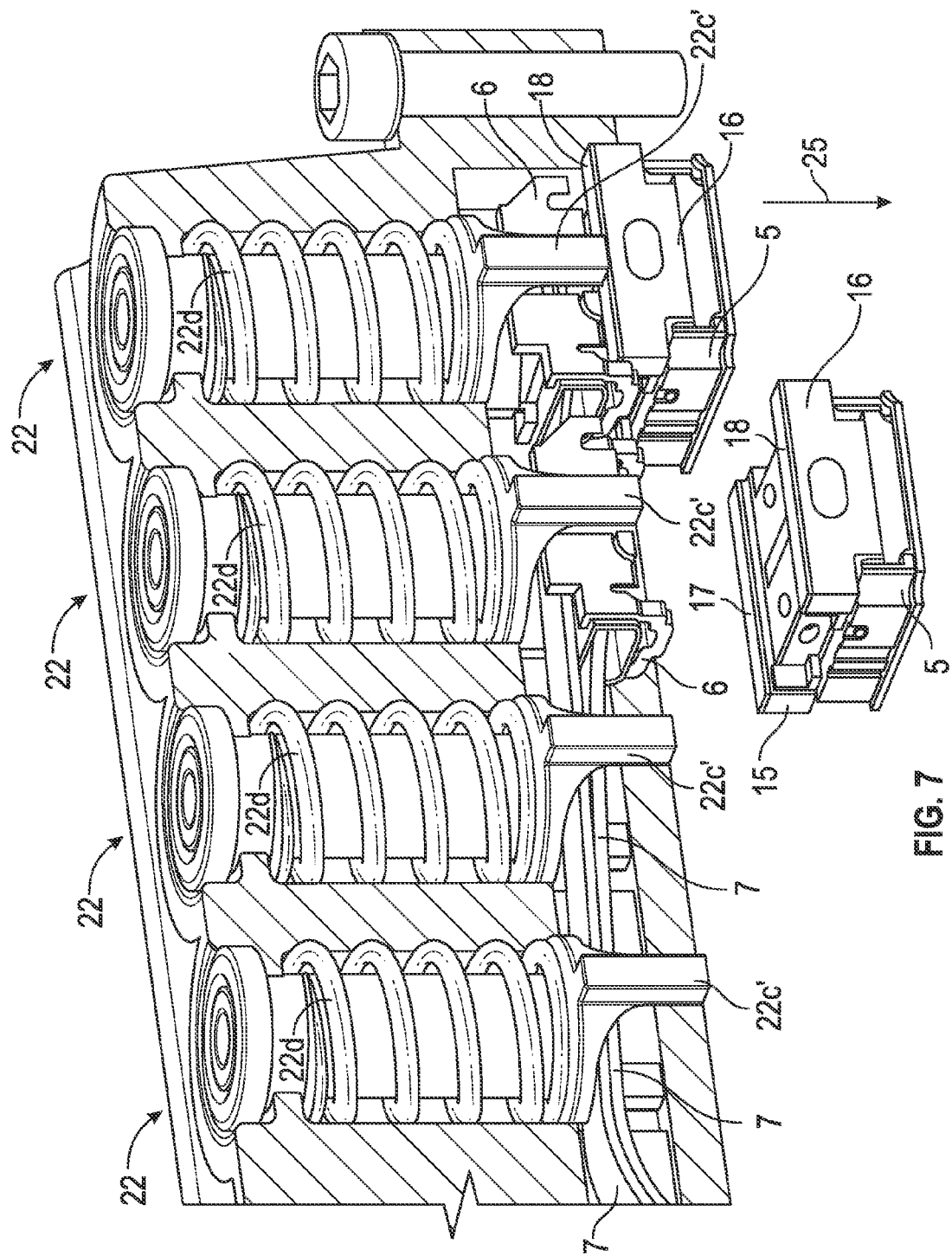
FIG. 7 illustrates a side perspective view of the portion of the heat dissipation clamp shown in FIG. 6C with one of the modules and with the connector of another one of the modules shown in FIG. 5 in contact with the respective U-shaped collars of the plungers of the force-application devices of the heat dissipation clamp.

FIG. 7 illustrates a side perspective view of the portion of the heat dissipation clamp 20 shown in FIG. 6C with one of the modules 5 and with the connector 6 of another one of the modules 5 in contact with the respective U-shaped collars 22c' of the plungers 22c of the force-application devices 22. The springs 22d of the force-application devices 22 urge the U-shaped collars 22c' downward (i.e., in the direction of arrow 25) against module 5 and into contact with small portions of the thermal pads 17 and 18. This causes the U-shaped collars 22c' to exert a precise amount of force needed for establishing and maintaining electrical connectivity between the modules 5 and the respective LGA connectors 4.

For example, in accordance with this illustrative embodiment, the springs 22d provide 8 lbs. of force in the direction indicated by arrow 25, which is precisely the amount of force needed for establishing and maintaining electrical interconnectivity between modules of the type shown in FIGS. 4 and 5 and the LGA sockets of the type shown in FIGS. 2 and 3. Of course, if different types of modules and sockets are used that require a different amount of force, the springs that are used will have spring characteristics that achieve the force needed for establishing and maintaining electrical interconnectivity. Also, while compression springs are used for this purpose in the illustrative embodiment, other types of springs may be used for this purpose, as will be understood by those skilled in the art in view of the description being provided herein.

One of the benefits provided by using the heat dissipation clamps 20 is that the long travel of the springs 22d allow the design to work well even in cases in which the system PCB 11 (FIG. 1) has a large amount of non-planarity, thereby eliminating the need to use a backing, or bolstering, plate on the side of the system PCB 11 opposite the side on which the array 1 is mounted. The forces exerted by the U-shaped collars 22c' on the modules 5 are the precise forces needed for electrical interconnectivity. Also, the springs 22d no not sag and have sufficient travel range to allow more conventional PCBs to be used without having to meet extreme flatness requirements over standard PCB tolerances. It should be noted that although a bolstering plate is not needed, one may be used if desired or deemed necessary for other reasons.

With reference again to FIG. 1, each of the frames 10 has a strain relief device 40 secured thereto by fastening devices 41 and 42 that fasten to frame 10 without penetrating into system PCB 11. In accordance with this illustrative embodiment, each of the strain relief devices 40 receives four optical fiber ribbon cables 7 that pass through the strain relief devices 40 and connect to the respective optical connectors 6 of the respective modules 5 (FIG. 5). Each cable 7 has an optics system 51 (FIG. 5) disposed on its end that mates with the respective optical connector 6 of the respective module 5. Once the optics systems 51 have been connected to the respective optical connectors 6 and the proper amount of slack has been provided in the cables 7 in between the strain relief devices 40 and the modules 5, clamps 52 of the strain relief devices 40, respectively, are tightened down by tightening the fastening devices 41 and 42 (FIG. 1) to secure them to the frame 10, thereby locking the cables 7 in position within the respective strain relief devices 40. Once locked in position, the cables 7 do not move if external forces within tolerances are exerted on them. This feature ensures that the electrical interconnectivity forces applied by the force-application devices 22 (FIG. 6A) will not be adversely affected by external forces exerted on the cables 7.

Figure 8:
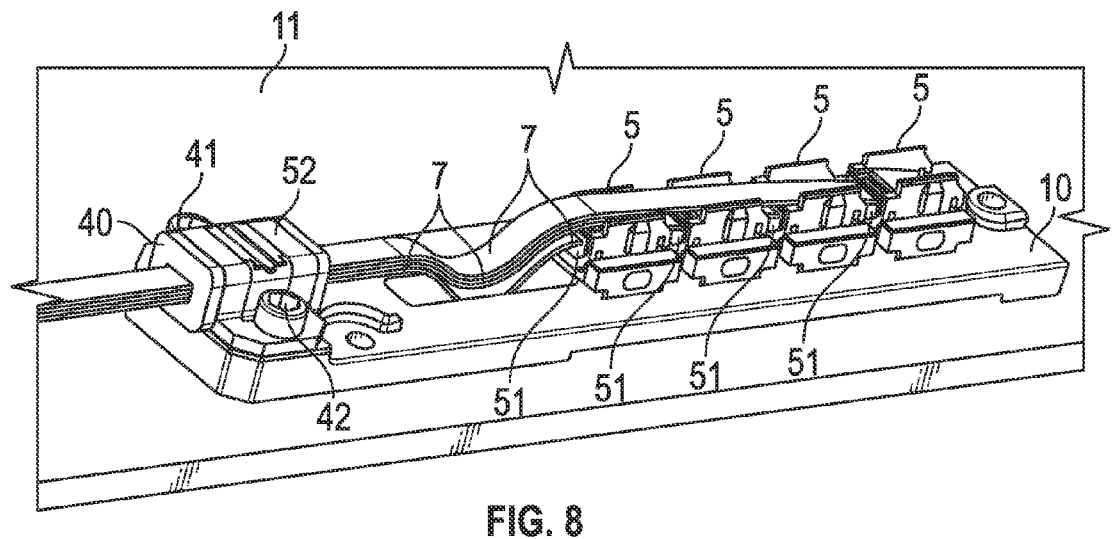
FIG. 8 illustrates a perspective view of one of the frames shown in FIG. 1 mounted on the system PCB shown in FIG. 1 and having four of the modules shown in FIG. 5 mounted thereon and sitting on their respective LGA sockets (force not yet applied to provide full electrical connection).

FIG. 8 illustrates a perspective view of one of the frames 10 shown in FIG. 1 mounted on the system PCB 11 and having four modules 5 mounted thereon and electrically interconnected with respective LGA sockets (not shown). Each module 5 is connected to the optics system 51 disposed on the end of the respective optical fiber cable 7. Using the frames 10 allows each of the four columns of the 4×4 array 1 shown in FIG. 1 to be separately assembled and allows each cable 7 to be given a precise amount of slack that ensures that it does not exert a pull force on the respective module 5 and that it does not bend beyond its minimum bend radius. Once the cables 7 have been connected to the respective modules 5 and a desired amount of slack has been provided in the cables 7, the clamps 52 are tightened down by tightening the fastening devices 41 and 42 in order to secure the cables 7 in position.

Figure 9:
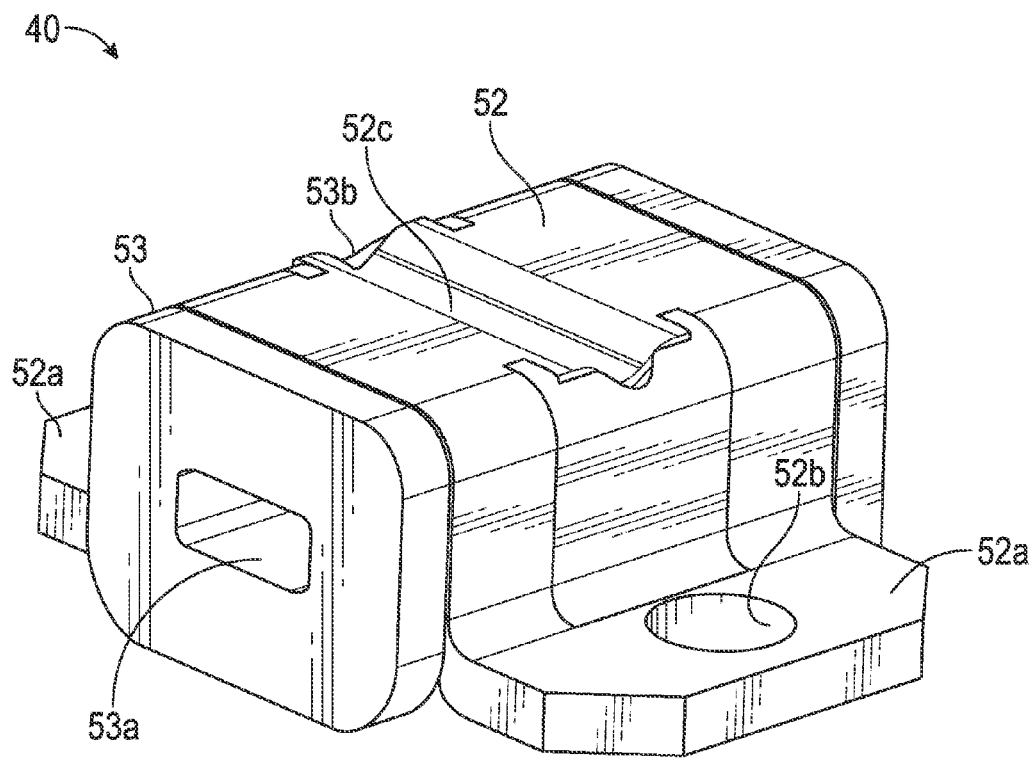
FIG. 9 illustrates a perspective view of one of the strain relief devices shown in FIG. 1.

FIG. 9 illustrates a perspective view of one of the strain relief devices 40. The strain relief device 40 comprises the clamp 52 and a generally rectangular body 53 that is typically made of a elastomeric material to give it a small degree of flexibility. The body 53 has an opening 53a formed therein that extends from a front end of the body 53 to a back end of the body 53. The opening 53a is slightly larger than the stack of four optical fiber ribbon cables 7 to allow the cables 7 to pass through it. The clamp 52 has flange portions 52a formed on opposite ends thereof that have respective openings 52b formed therein through which the fastening devices 41 and 42 (FIGS. 1 and 8) pass. An upper surface of the body 53 has a thinned region 53b formed therein that is complementary in shaped to an indented region 52c of the clamp 52. When the clamp 52 is tightened down by tightening the fastening devices 41 and 42 (FIG. 1), the indented region 52c exerts a downward force on the thinned region 53b that causes the upper and lower inner surfaces of the opening 53a to move toward one another to tightly grip the stack of cables 7, thereby locking them in position.

It should be noted that the strain relief devices that are used for this purpose can have a variety of configurations other than that shown in FIG. 9. Any suitable strain relief device may be used for this purpose. It should also be noted that the heat dissipation clamps 20 can be designed to be secured directly to the system PCB 11. Also, while multiple frames 10 are shown in FIG. 1, a single frame may be used for the array. For example, a single frame having a 4×4 array of the openings 12 (FIG. 3) can be used to interface the 4×4 array of modules 5 with the system PCB 11. Similarly, while four separate heat dissipation clamps 20 are shown in FIG. 1, a single heat dissipation clamp could be used. For example, a single heat dissipation clamp having a 4×4 array of the force-application devices 22 could be used to provide the electrical interconnectivity forces for the 4×4 array of modules 5.

Figure 10:
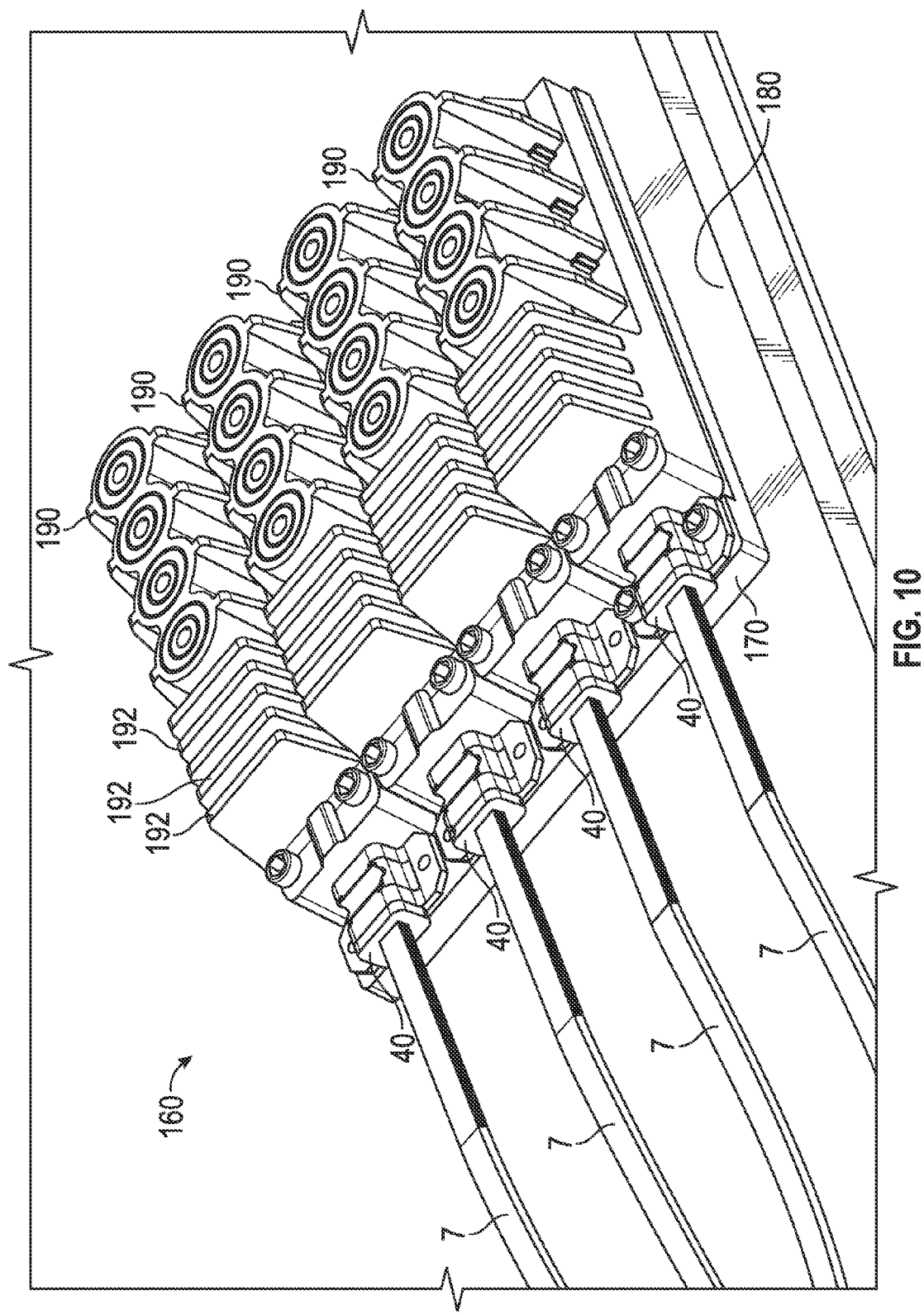
FIG. 10 illustrates a top perspective view of an illustrative embodiment of a 4×4 array of parallel optical communications modules mounted on a single frame that is secured to an upper surface of a system PCB and that has four heat dissipation clamps secured thereto.

FIG. 10 illustrates a top perspective view of an illustrative embodiment of a 4×4 array 160 of parallel optical communications modules mounted on a single frame 170 that is secured to an upper surface of a system PCB 180 and that has four heat dissipation clamps 190 secured thereto. In the illustrative embodiment shown in FIG. 1, the heat dissipation clamps 20 have heat dissipation fins 191 for air flow that extend in directions parallel to the optical axes of the cables 7. In the illustrative embodiment shown in FIG. 10, the heat dissipation clamps 190 have heat dissipation fins 192 for air flow that extend in directions perpendicular to the optical axes of the cables 7. In all other respects, the heat dissipation clamps 20 and 190 may be identical to one another. This is merely an example of the manner in which modifications may be made to the heat dissipation clamps without changing their functions. The single frame 170 is essentially a combination of the four frames 10 shown in FIG. 1. Thus, the single frame 170 performs the same functions that are performed by the four frames 10.

The invention has been described with reference to illustrative embodiments for the purpose of demonstrating principles and concepts of the invention. As will be understood by those skilled in the art in view of the description being provided herein, many modifications other than those described herein may be made to the embodiments described herein while still achieving the goals of the invention, and all such modifications are within the scope of the invention. For example, although the force-application devices 22 have been shown and described with reference to an illustrative embodiment as having a particular configuration, force-application devices that are used for this purpose may have configurations that are different from that shown and described herein, as will be understood by persons of skill in the art in view of the description provided herein.

What is claimed is:

1. An optical communications system comprising:
a system circuit board;
a plurality of sockets disposed on a surface of the system circuit board;
a plurality of optical communications modules, each module being installed in a respective socket, each module including at least a first heat sink device; and
a heat dissipation system comprising at least a first heat dissipation clamp, the first heat dissipation clamp comprising a body and N force-application devices mechanically coupled to the body, where N is a positive integer that is greater than or equal to 2, the body being mechanically coupled to the system circuit board and thermally coupled to the heat sink devices of the modules, the body being made of a thermally-conductive material, each force-application device applying a respective force against a respective optical communications module that aids in maintaining an electrical interconnection between the module and the respective socket, and wherein heat is transferred from the first heat sink devices of the respective modules into the body of the heat dissipation clamp where at least some of the heat is dissipated.

2. The optical communications system of claim 1, wherein the forces that are applied by the respective force-application devices against the respective modules are independent of one another.

3. The optical communications system of claim 2, wherein inner walls of the body are in contact with the heat sink devices of the modules to create thermal pathways for heat transfer from the heat sink devices of the modules into the body.

4. The optical communications system of claim 3, wherein the force-application devices are spring-loaded devices.

5. The optical communications system of claim 4, wherein each spring-loaded device includes a plunger and a spring, the plunger being capable of limited movement in first and second directions that are opposite one another and generally perpendicular to the surface of the circuit board on which the sockets are disposed, the first direction being toward the surface of the circuit board and the second direction being away from the circuit board, the spring limiting the movement of the plunger in the second direction and applying a force on the plunger in the first direction to urge the plunger toward the surface of the system circuit board.

6. The optical communications system of claim 5, wherein each spring-loaded device further comprises:
a hollow cylindrical shaft having a proximal end and a distal end; and
a rod disposed at least partially inside of the hollow cylindrical shaft, the rod having a proximal end and a distal end, the distal end of the rod having a U-shaped collar disposed thereon for engaging the respective module, and wherein the spring is an open-coil helical spring that surrounds the shaft, a proximal end of the spring being in contact with an inner surface of the body to prevent the proximal end of the spring from moving in the second direction, the distal end of the spring being in contact with the U-shaped collar and exerting a force on the U-shaped collar in the first direction to cause the U-shaped collar to exert the respective force against the respective module that aids in maintaining the electrical interconnections between the module and the respective socket.

7. The optical communications system of claim 4, wherein the body has an elongated rectangular shape, and wherein the force-application devices are linearly arranged in the body in a longitudinal direction of the body.

8. The optical communications system of claim 7, wherein at least a four-by-four array of the sockets are disposed on the surface of the system circuit board and have a four-by-four array of the optical communications modules installed therein, and wherein the optical communications system comprises at least four of the heat dissipation clamps for dissipating heat generated by the four-by-four array of modules, and wherein N is equal to 4 such that each heat dissipation clamp includes four force-application devices for applying the forces against four respective modules to aid in maintaining the electrical interconnections between the four modules and the four respective sockets.

9. The optical communications system of claim 7, further comprising:
a frame secured to the surface of the system circuit board, the frame having openings formed therein equal in number to the number of sockets disposed on the surface of the system circuit board, each opening being defined by four inner walls of the frame that are perpendicular to the surface of the system circuit board, wherein the inner walls that define each opening form side walls of the respective receptacle, wherein each socket forms a bottom of the respective receptacle, and wherein the heat dissipation clamp is fixedly secured to a surface of the frame that is parallel to and opposite the surface of the system circuit board, the frame mechanically coupling the heat dissipation clamp to the system circuit board.

10. The optical communications system of claim 9, wherein the frame is secured to the surface of the system circuit board by epoxy.

11. The optical communications system of claim 9, wherein the frame is secured to the surface of the system circuit board by one or more fastening devices that penetrate the surface of the system circuit board.

12. The optical communications system of claim 9, further comprising at least a first strain relief device for relieving strain in a plurality of optical fiber cables, each optical fiber cable having an end that is connected to a respective optical communications module, the first strain relief device being mechanically coupled to the frame.

13. The optical communications system of claim 1, further comprising at least a first strain relief device for relieving strain in a plurality of optical fiber cables, each optical fiber cable having an end that is connected to a respective optical communications module, the first strain relief device being mechanically coupled to the surface of the system circuit board.

14. The optical communications system of claim 1, wherein the body of the heat dissipation clamp is mechanically coupled directly to the surface of the system circuit board.

* * * * *